United States Patent
Tseng et al.

(10) Patent No.: US 11,527,113 B2
(45) Date of Patent: Dec. 13, 2022

(54) ADAPTIVE DIAGNOSTIC PARAMETRIZATION

(71) Applicant: Ford Global Technologies, LLC, Dearborn, MI (US)

(72) Inventors: Fling Finn Tseng, Ann Arbor, MI (US); Imad Hassan Makki, Dearborn Heights, MI (US); Aed M. Dudar, Canton, MI (US); Medville Jay Throop, Ann Arbor, MI (US); Brian David Tillman, Dearborn, MI (US); Dimitar Petrov Filev, Novi, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 400 days.

(21) Appl. No.: 16/611,044

(22) PCT Filed: May 5, 2017

(86) PCT No.: PCT/US2017/031345
§ 371 (c)(1),
(2) Date: Nov. 5, 2019

(87) PCT Pub. No.: WO2018/203911
PCT Pub. Date: Nov. 8, 2018

(65) Prior Publication Data
US 2020/0160628 A1 May 21, 2020

(51) Int. Cl.
*G07C 5/08* (2006.01)
*G06F 16/28* (2019.01)
*G07C 5/00* (2006.01)

(52) U.S. Cl.
CPC ......... *G07C 5/0808* (2013.01); *G06F 16/285* (2019.01); *G07C 5/008* (2013.01); *G07C 5/0841* (2013.01)

(58) Field of Classification Search
CPC .... G07C 5/0808; G07C 5/008; G07C 5/0841; G07C 5/08; G07C 5/00; G06F 16/285; G01F 1/00; G01M 17/00; G01M 17/007
(Continued)

(56) References Cited

U.S. PATENT DOCUMENTS

| | | |
|---|---|---|
| 4,267,569 A | 5/1981 | Baumann et al. |
| 6,301,531 B1 | 10/2001 | Pierro et al. |

(Continued)

FOREIGN PATENT DOCUMENTS

| | | | |
|---|---|---|---|
| CN | 106053088 A | 10/2016 | |
| DE | 4203099 A1 * | 8/1993 | ......... F02M 25/0809 |
| JP | 2005339142 A | 12/2005 | |

OTHER PUBLICATIONS

International Search Report of the International Searching Authority for PCT/US2017/031345 dated Jul. 17, 2017.
(Continued)

*Primary Examiner* — Muhammad Shafi
(74) *Attorney, Agent, or Firm* — Brandon Hicks; Bejin Bieneman PLC (57) ABSTRACT

A system comprises a processor that is programmed to define a plurality of vehicle groups based on vehicle specification data and define a plurality of sub-groups for each of the vehicle groups based on environmental data and sensor data received from each of a plurality of vehicles. The processor is programmed to adjust fuel tank leak detection classifiers for the sub-groups based on ground truth data. The ground truth data include, for each of the plurality of vehicles, a leak detection status and a leak test result.

18 Claims, 5 Drawing Sheets

(58) Field of Classification Search
USPC ............................................. 701/29.6
See application file for complete search history.

(56) References Cited

U.S. PATENT DOCUMENTS

| | | | | |
|---|---|---|---|---|
| 6,311,548 | B1* | 11/2001 | Breidenbach | F02M 25/0809 73/40 |
| 6,336,065 | B1 | 1/2002 | Gibson et al. | |
| 6,928,348 | B1 | 8/2005 | Lightner et al. | |
| 7,347,082 | B1* | 3/2008 | Kohn | F02M 25/0818 73/40 |
| 8,036,788 | B2* | 10/2011 | Breed | G07C 5/0808 701/31.9 |
| 8,181,507 | B2 | 5/2012 | McLain et al. | |
| 9,243,591 | B2 | 1/2016 | Jentz et al. | |
| 2002/0062820 | A1* | 5/2002 | Herm | F02M 25/0809 73/114.39 |
| 2003/0061864 | A1* | 4/2003 | Wong | F02M 25/0809 73/40 |
| 2006/0185423 | A1* | 8/2006 | Mc Lain | G01M 3/025 73/49.7 |
| 2007/0214871 | A1* | 9/2007 | Kano | F02M 25/089 73/49.7 |
| 2014/0277927 | A1 | 9/2014 | Guo et al. | |
| 2015/0068499 | A1* | 3/2015 | Sano | F02M 25/0809 123/520 |
| 2015/0219522 | A1 | 8/2015 | Tseng et al. | |
| 2016/0040630 | A1 | 2/2016 | Li | |
| 2016/0069771 | A1 | 3/2016 | Makki et al. | |

OTHER PUBLICATIONS

First Chinese Office Action as issued by the Chinese Patent Office dated May 27, 2021 (in English and Chinese).
Notification of Third Office Action as issued by the Chinese Patent Office dated Jun. 1, 2022 (in English and Chinese).

* cited by examiner

ADAPTIVE DIAGNOSTIC PARAMETRIZATION

BACKGROUND

Vehicles may be powered by combustion engines. A vehicle that has a combustion engine typically has a fuel tank that provides fuel, e.g., gasoline, to the engine. A fuel tank may have a leak that results in fuel draining from the fuel tank. Due to chemical properties of engine fuels, a leak of fuel from the fuel tank may pose environmental concerns. Therefore, to detect such a leak, vehicles are typically equipped with leak detection systems to detect a leak from the fuel tank. Typically, a vehicle leak detection system is expected to detect very small fuel leaks, e.g., a hole in the fuel tank with a diameter at or above 0.02 inch (0.508 millimeter). Detection of such small leaks may be a challenge for a vehicle leak detection system.

DETAILED DESCRIPTION

Introduction

Disclosed herein is a system including a processor that is programmed to define a plurality of vehicle groups based on vehicle specification data. The processor is programmed to define a plurality of sub-groups for each of the vehicle groups based on environmental data and sensor data received from each of a plurality of vehicles. The processor is further programmed to adjust fuel tank leak detection classifiers for the sub-groups based on ground truth data including, for each of the plurality of vehicles, a leak detection status and a leak test result.

The vehicle specification data may include one or more of vehicle model, fuel tank volume, fuel tank thermal properties, engine volume, location of heat dissipating vehicle components relative to the fuel tank, transmission properties, fuel tank shape, exhaust parameters, and location of fuel tank pressure sensor relative to the fuel tank.

The vehicle sensor data may include one or more of engine operating state, fuel tank pressure, fuel tank temperature, engine coolant temperature, fuel parameters, vehicle orientation, vehicle location coordinates, fuel gauge value, last trip duration, last trip driving conditions, and last trip route.

The environmental data may include one or more of air temperature, air pressure, precipitation status, and wind condition.

The processor may be further programmed to define vehicle groups by identifying two or more vehicles that share at least one identical parameter included in the vehicle specification data.

The processor may be further programmed to define sub-groups of a selected vehicle group by determining a statistical correlation of the vehicle sensor data and environmental data associated with the vehicles includes in the selected vehicle group, and identifying two or more vehicles from the vehicle group based on the determined statistical correlation and a deviation threshold.

The statistical correlation of the vehicle sensor data may include a geographical distribution of the vehicles of the selected vehicle group.

The deviation threshold may include a maximum dimension threshold associated with an area in which the vehicles of the sub-group are geographically located.

The processor may be further programed to adjust the fuel tank leak detection classifiers by identifying a leak detection curve threshold based on the vehicle sensor data and the ground truth data.

The ground truth data may further include vehicle sensor data and ambient data from a time of detecting a leak in the fuel tank.

The leak detection curve threshold may be determined based on a data classification method.

The processor may be further programed to identify at least a falsely detected leak in a vehicle in the plurality of vehicles, wherein the leak detection status of the vehicle indicates a detected leak, and a leak test result of the vehicle is negative, and adjust the classifiers for the sub-group that includes the vehicle based on the falsely detected leak.

The leak detection status may further include a time of detecting a leak, and vehicle operating data from the time of detecting the leak.

The processor may be further programmed to perform leak detection based on the adjusted classifiers.

The leak test result may be a smoke test result.

Further disclosed herein is a method that includes defining a plurality of vehicle groups based on vehicle specification data, defining a plurality of sub-groups for each of the vehicle groups based on environmental data and sensor data received from each of a plurality of vehicles, and adjusting fuel tank leak detection classifiers for the sub-groups based on ground truth data including, for each of the plurality of vehicles, a leak detection status and a leak test result.

The vehicle specification data may include one or more of vehicle model, fuel tank volume, fuel tank thermal properties, engine volume, location of heat dissipating vehicle components relative to the fuel tank, and location of fuel tank pressure sensor relative to the fuel tank.

The vehicle sensor data may include one or more of engine operating state, fuel tank pressure, fuel tank temperature, vehicle orientation, vehicle location coordinates, fuel gauge value, last trip duration, last trip driving conditions, and last trip route.

Defining vehicle groups may further include identifying two or more vehicles that share at least one identical parameter included in the vehicle specification data.

Defining sub-groups of a selected vehicle group may further include determining a statistical correlation of the vehicle sensor data and environmental data associated with the vehicles includes in the selected vehicle group, and identifying two or more vehicles from the vehicle group based on the determined statistical correlation and a deviation threshold.

Further disclosed is a computing device programmed to execute the any of the above method steps. Yet further disclosed is a vehicle comprising the computing device.

Yet further disclosed is a computer program product, comprising a computer readable medium storing instructions executable by a computer processor, to execute any of the above method steps.

Exemplary System Elements

Figure 1:
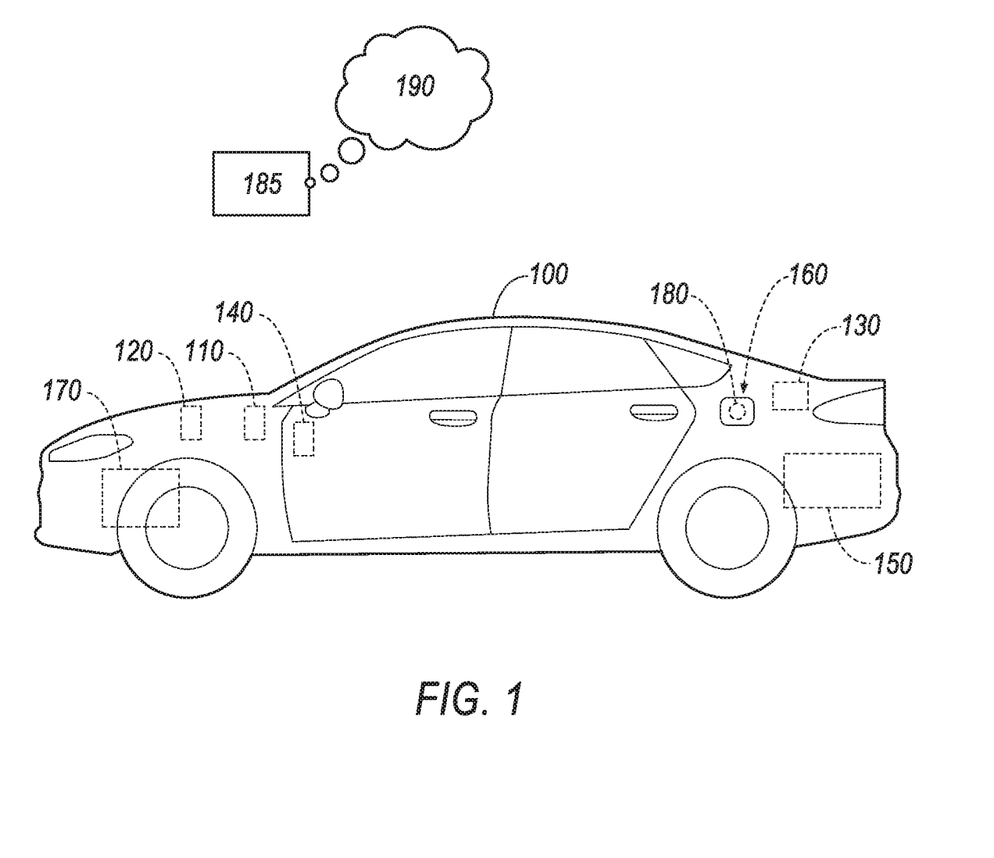
FIG. 1 is a block diagram of an exemplary vehicle system.
Figure 2:
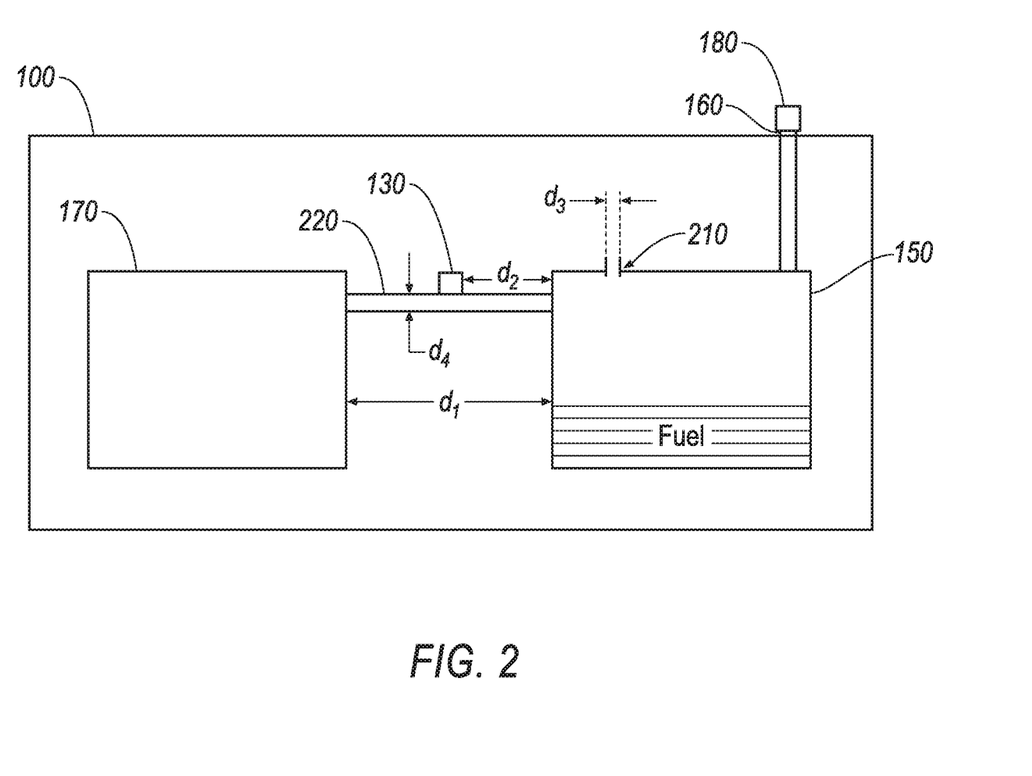
FIG. 2 is a diagram showing a fuel tank and an engine of the vehicle of FIG. 1 fluidly coupled via a fuel hose.

FIGS. 1-2 illustrate a vehicle 100. The vehicle 100 may be powered in a variety of known ways, e.g., with a powertrain that includes an internal combustion engine 170. The vehicle 100 may include a hybrid powertrain, e.g., including a combination of an internal combustion engine 170 and an electric motor. Although illustrated as a passenger car, the vehicle 100 may be any automobile such as a car, a truck, a sport utility vehicle, a crossover vehicle, a van, a minivan, etc. The vehicle 100 may include a computer 110, actuator(s) 120, sensor(s) 130, and a human machine interface (HMI) 140).

The vehicle 100 includes one or more fuel tank(s) 150 that store fuel, e.g., gasoline, for operating the vehicle 100 engine 170. The fuel tank 150 may be fluidly coupled to the engine 170 via a fuel hose 220. The vehicle 100 may include a fuel fill inlet 160 for refilling the fuel tank 150. The fuel fill inlet 160 may be fluidly coupled to the fuel tank 150. The vehicle 100 may include a fuel cap 180 that closes the fuel fill inlet 160. A user may fill the fuel tank 150, e.g., in a gas station, by removing (e.g., unscrewing) the fuel cap 180 and tightening the fuel cap 180 (e.g., screwing) after filling up the fuel tank 150. The fuel tank 150 may be disposed in any location in the vehicle 100 with a distance $d_1$ to the engine 170 (see FIG. 2). For example, the fuel tank 150 may be disposed in a rear portion of the vehicle 100 and the engine 170 may be disposed in a front section of the vehicle. The fuel tank 150 and the engine 170 may be coupled via a fuel hose 220 via which fluid (liquid) fuel is supplied from the tank 150 to the engine 170. The fuel tank 150 may be formed of steel, plastic, etc. For example, a plastic fuel tank 150 may be formed of high-density polyethylene.

The computer 110 includes a processor and a memory such as are known. The memory includes one or more forms of computer-readable media, and stores instructions executable by the computer 110 for performing various operations, including as disclosed herein.

The computer 110 may include programming to operate one or more systems of the vehicle 100, e.g., land vehicle brakes, propulsion (e.g., control of acceleration in the vehicle 100 by controlling one or more of an internal combustion engine, electric motor, hybrid engine, etc.), steering, climate control, interior and/or exterior lights, etc.

The computer 110 may include or be communicatively coupled to, e.g., via a communications bus of the vehicle 100 as described further below, more than one processor, e.g., controllers or the like included in the vehicle 100 for monitoring and/or controlling various controllers of the vehicle 100, e.g., a powertrain controller, a brake controller, a steering controller, etc. The computer 110 is generally arranged for communications on a communication network of the vehicle 100, which can include a bus in the vehicle 100 such as a controller area network (CAN) or the like, and/or other wired and/or wireless mechanisms.

Via the communication network of the vehicle 100, the computer 110 may transmit messages to various devices in the vehicle 100 and/or receive messages from the various devices, e.g., an actuator 120, an HMI 140, etc. Alternatively or additionally, in cases where the computer 110 actually comprises multiple devices, the vehicle communication network may be used for communications between devices represented as the computer 110 in this disclosure.

The actuators 120 of the vehicle 100 are implemented via circuits, chips, or other electronic and/or mechanical components that can actuate various vehicle subsystems in accordance with appropriate control signals, as is known. The actuators 120 may be used to control vehicle systems such as braking, acceleration, and/or steering of the vehicles 100.

In addition, the computer 110 may be configured for communicating through a vehicle-to-infrastructure (V-to-I) interface with other vehicles, and/or a remote computer 185 via a network 190. The network 190 represents one or more mechanisms by which the computer 110 and the remote computer 185 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth, IEEE 802.11, etc.), dedicated short range communications (DSRC), local area networks (LAN) and/or wide area networks (WAN), including the Internet, providing data communication services.

The HMI 140 may be configured to receive user input, e.g., during operation of the vehicle 100. Moreover, an HMI 140 may be configured to present information to the user. Thus, the HMI 140 may be in a passenger compartment of the vehicle 100. For example, the HMI 140 may provide information to the user including a detected leak in the fuel tank 150. As discussed below, a leak can be detected after engine 170 is turned off where most of electrical components are powered down; therefore, the HMI 140 may first provide information including a detected leak in a next driving cycle, e.g., a next time that the engine 170 is turned on.

The sensors 130 of the vehicle 100 may include a variety of devices known to provide sensor 130 data via the vehicle 100 communications bus. The vehicle 100 sensor 130 data may include engine operating state, e.g., running, off, etc., fuel tank 150 pressure, fuel tank 150 temperature, engine 170 coolant temperature, fuel parameters (e.g., Reid Vapor Pressure), vehicle 100 orientation, vehicle 100 location coordinates, fuel gauge value, last trip duration, last trip driving conditions, and last trip route.

For example, the sensors 130 may include temperature and/or pressure sensors 130 disposed in the vehicle 100. A pressure and/or temperature sensor 130 may provide temperature and/or pressure data encompassing an exterior (e.g., ambient) of the vehicle 100. A pressure and/or temperature sensor 130 may include a transducer that converts an applied pressure and/or temperature to, e.g., a change in an electrical parameter such as electrical resistance, capacity, etc.

In another example, as shown in FIG. 2, a pressure and/or temperature sensor 130 may provide data encompassing an interior of the fuel hose 220, i.e., temperature and/or pressure inside the hose 220. The sensor 130 may be mounted to the fuel hose 220 with a distance $d_2$, e.g., 10 cm, from the fuel tank 150. The distance $d_2$ may refer to a length of a section of the hose 220 disposed between the sensor 130 and the fuel tank 150 exterior surface. A pressure inside the fuel tank 150 may be related to the pressure at the sensor 130 mounted to the hose 220. Thus, the computer 110 may be programmed to determine a temperature and/or pressure of the interior of the fuel tank 150 based at least in part on the received sensor 130 data, the distance $d_2$, and/or a fuel hose 220 diameter $d_4$. Additionally or alternatively, a sensor 130 may be mounted to the fuel tank 150 that determines the pressure and/or temperature of the fuel tank 150 interior.

The sensors 130 may include a fuel gauge sensor 130 that determines a level of fuel left in the fuel tank 150. The computer 110 may be programmed to determine a volume of air and/or fuel vapor left in the fuel tank 150 based on data received from the fuel gauge sensor 130. For example, the computer 110 may be programmed to determine the volume of air and/or vapor in the fuel tank 150 based the current level of the fuel in the tank 150 and known fuel tank 150 capacity, e.g., 50 liters, may be stored in the computer 110 memory.

The vehicle 100 may include a Global Positioning System (GPS) sensor 130 configured to determine coordinates of a current location of the vehicle 100. The computer 110 may be programmed to transmit the vehicle 100 location coordinates to the remote computer 185 via the network 190. In one example, the remote computer 185 may be programmed to determine environmental data of the vehicle 100 based at least in part on the determined location coordinates of the vehicle 100. Environmental data includes data associated with an area (or environment) surrounding the vehicle 100, e.g., an area with a radius of 1 kilometer (km) around the vehicle 100. The environmental data of the vehicle 100 may include air pressure, temperature, wind condition, precipitation status, etc. in an area surrounding the vehicle 100. In one example, the remote computer 185 may be programmed to determine the environmental data based on information received from weather stations distributed in various geographical locations. Additionally or alternatively, the computer 185 may be programmed to receive environmental data from vehicles 100 sensors 130, e.g., an ambient air temperature and/or pressure sensor 130 disposed in vehicles 100 bumper.

Vehicle 100 fuel is typically flammable and may include chemical contaminants that are hazardous for environment, e.g., to soil, ground water, etc. Thus, a leak of fuel from the fuel tank 150 may pose an environmental and/or safety issue. Fuel may leak from the fuel tank 150 may be in form of a liquid fluid and/or a vapor. For example, the fuel cap 180 may not close properly and/or be left open after fueling the vehicle 100. In another example, a hole 210 may exist in the fuel tank. The hole 210 may be in any location of the fuel tank 150 or other components, such as the fuel inlet 160 hose, that are fluidly coupled to the fuel tank 150. In one example, the vehicle 100 computer 110 may be programmed to determine whether there is a leak in the vehicle fuel tank 150 (or other components such as the hose 220, the inlet 160, etc.) that has a diameter $d_3$ greater than or equal to 0.02 inch (0.508 millimeter). A leak hole 210 may have a rectangular, oval, circular, or asymmetrical shape such as a crack.

Exposure of vehicles 100 to different environmental conditions such as different ambient air pressures, different driving conditions, etc., may result in an incorrect detection of a fuel tank 150 leak. For example, the vehicle 100 computer 110 may incorrectly detect a leak where in fact no leak exists (herein also referred to as false positive); and/or the computer 110 may fail to detect (herein also referred to as misdetection) an existing leak in the fuel tank 150.

With reference to FIGS. 1-2, the remote computer 185 may be programmed to define one or more vehicle groups based on vehicle 100 specification data, described further below, and define one or more sub-groups for each of the vehicle 100 groups based on the environmental data and sensor 130 data received from each of a plurality of vehicles 100. The remote computer 185 may be further programmed to adjust fuel tank 150 leak detection classifiers for the sub-groups based on ground truth data including, for each of the vehicles 100, a leak detection status and a leak test result. Each of the vehicles 100 computer 110 may be programmed to receive the adjusted classifiers from the remote computer 185 and perform leak detection based on the adjusted classifiers. Thus, advantageously, the adjustment of the classifier may result in preventing a false detection and/or misdetection of a leak in a vehicle 100 fuel tank 150. In one example, the remote computer 185 may be programmed to provide the adjusted classifiers to the computers 110, only upon a confirmation of the adjusted classifiers by a third-party computer, e.g., a standard authority.

The vehicle 100 computer 110 may be programmed to operate the leak detection, i.e., evaluate whether there is a fuel tank 150 leak, upon determining that certain diagnostic entry conditions are met. For example, the computer 110 may be programmed to determine whether the vehicle 100 engine 170 is turned off based on the received engine 170 status data. Additionally or alternatively, the sensors 130 data may include vehicle 100 speed, etc. The computer 110 may be programmed to determine whether the vehicle 100 is stopped based on the received vehicle 100 speed. The computer 110 may be programmed to determine that the entry conditions are met upon determining that the engine 170 is turned off. Additionally, the computer 110 may be programmed to determine that the entry conditions are met upon determining that the fuel tank 150 is not being refueled. The computer 110 may be programmed to operate the leak detection for a predetermined duration of time, e.g., 30 minutes, after engine 170 turned off. In one example, because the engine 170 is off during the leak detection status, the computer 110 may operate in a low power mode to reduce an amount of computer 110 energy consumption.

The vehicle 100 specification data may include one or more of vehicle 100 model, engine 170 type (e.g., gasoline, hybrid, etc.), fuel tank 150 volume, fuel tank 150 thermal properties such as thermal resistance, fuel tank 150 material, engine 170 cylinder capacity, location of heat dissipating vehicle components such as engine 170, batteries, etc. relative to the fuel tank 150 (e.g., the distance $d_1$ in FIG. 2), vehicle 100 transmission type (4-wheel drive, all-wheel drive, etc.), fuel tank 150 shape, exhaust configuration (e.g., heat dissipation parameters of exhaust), whether there is a fuel tank cap or the tank is capless, and location of fuel tank 150 pressure sensor 130 relative to the fuel tank 150 (e.g., the distance $d_2$ in FIG. 2). A vehicle 100 transmission type may affect how a density of vehicle 100 components, i.e., how closely they are placed next to one another. A density of packaging vehicle 100 components may affect an amount of heat to which the tank 150 is exposed. An increase of heat typically increases a pressure inside the tank 150 which has an effect on leak detection. As another example, an exhaust configuration may have an effect on heat dissipation of the fuel tank 150. The fuel inlet 160 may have different mechanisms to close, e.g., with the cap 180 or a capless mechanism such as is now often used. As discussed below, the vehicles 100 may be grouped based on the vehicle 100 specification data in order to have vehicles 100 in a group that are suited to be compared to one another regarding leak detection conditions.

The leak detection status of each of the vehicles 100 may include a leak state and a no-leak state. In one example, the leak state may mean that there is a leak with a diameter equal to or greater than 0.02 inch. The no-leak state may mean that either there is no leak or a diameter of the leak is less than 0.02 inch. The vehicle 100 computer 110 may be programmed to determine the leak detection status based on the leak detection classifiers and vehicle 100 sensor 130 data. Additionally, the leak detection status may include an inconclusive state, i.e., the computer 110 cannot conclude whether there is a leak or not. For example, the classifier may include a hysteresis area such as within 1% less than and/or greater than a threshold where a decision cannot be made. The computer 110 of each of the vehicles 100 may be programmed to store the leak detection status in a computer 110 memory and/or transmit the leak detection status to the remote computer 185. The vehicle 100 computer 110 may be further programmed to output data to the vehicle 100 HMI 140 based on the leak detection status. For example, the HMI 140 may include a malfunction indicator light (MIL) and the computer 110 may be programmed to actuate the malfunction indicator light to turn on when a leak is detected in the vehicle 100 fuel tank 150.

A fuel tank 150 can be tested, e.g., in a service facility, a lab, etc. to determine whether there is a leak in the fuel tank 150. A result of such test is herein referred to as a leak test result, whereas a determination made by the computer 110 that there is or is not a leak is herein referred to as a leak detection status. For example, the fuel tank 150 can be tested using a smoke test technique to determine whether there is a leak in the tank 150. In a smoke test, a chemical in the fuel tank 150 produces visible smoke which, if seen outside the tank 150, may then indicate a leak of the tank 150. The vehicle 100 may be tested in the garage to verify whether a detected leak was a false positive or a correctly detected leak. Similarly, when there is no leak detected by the vehicle 100 computer 110, the leak test result may determine a leak, i.e., the vehicle 100 computer 110 correctly determined that there is no leak in the tank 150.

The ground truth data associated with each vehicle 100 include the leak test result and the leak detection status of the respective vehicle 100. As stated above, the leak detection status indicates whether a leak is or is not detected (determined by the computer 110), and further may include a time and date of determining the leak. In other words, the ground truth data for each vehicle 100 indicate whether a detection of a leak and/or determining that there is no leak was correct. The ground truth data indicates a correct detection of a leak when the leak detection status and the leak test result are same, i.e., both determining a leak or both determining no leak. The ground truth data may indicate an incorrect detection of a leak when the leak detection status and the leak test result differ, e.g., the leak detection status indicates a leak but the leak test result concludes that there is no leak, and/or the leak detection status indicates no leak, whereas the leak test result concludes that there is a leak in the tank 150. As discussed below regarding FIG. 3A, the classifier may be defined based on ground truth data. As further discussed with respect to FIGS. 3B-3C, the classifiers may be adjusted based on new ground truth data, e.g., after the computer 185 receives new ground truth data indicating a false positive.

In one example, the ground truth data may be determined based on the date and time of the leak detection status. In one example, the vehicle 100 computer 110 may store operating data of the vehicle 100 (i.e., data available from vehicle 100 sensors and/or controllers, e.g., via a vehicle network such as a communications bus) at a time of determining a leak, e.g., temperature and/or pressure in the fuel tank 150 and/or the ambient temperature around the vehicle 100, last engine 170 driving conditions, etc. Additionally, the computer 110 may be programmed to store the operating data periodically, e.g., every hour, even when concluding that there is no leak in the tank 150. As discussed below regarding FIG. 3C, this information may be necessary to determine the operating data associated with a misdetection of an existing leak (i.e., a time at which the computer 110 incorrectly concluded that there was no leak).

The remote computer 185 may further be programmed to receive the operating data of the vehicle 100 at the time of determining the leak detection status and determine an adjusted classifier based on the stored information. In one example, the vehicle 100 computer 110 may have determined a leak while the vehicle was in an elevated area, e.g., a mountainous area. The leak test result of the vehicle 100 tank 150, however, may indicate a false positive detection (i.e., no leak). The computer 185 may identify the false positive $O_F$ based on the operating data in the mountainous area and not on current operating data, e.g., in a service center at a low elevation and different pressure and/or temperature. Thus, advantageously, stored operating data can provide information about the conditions in which the false positive detection was made.

Defining vehicle 100 groups may further include identifying two or more vehicles 100 that share at least one identical parameter, e.g., fuel tank 150 volume, which data is typically included in the vehicle 100 specification data. The computer 185 may be programmed to receive the vehicle 100 specification data from the vehicle 100. The computer 185 may be programmed to define the vehicle 100 groups based on one or more of parameters included in the vehicle 100 specification data. In one example, the computer 185 may be programmed to determine that vehicles 100 of same model are included in one group. In another example, the computer 185 may be programmed to determine that vehicles 100 with same fuel tank 150 thermal properties, same engine 170 cylinder capacity, and same distance $d_1$ between the engine 170 and the fuel tank 150 are included in same group. The fuel tanks 150 of the vehicles 100 in a same group may share similar thermodynamic characteristics, e.g., similar volume, thermal conductivity, heat source, etc., and therefore the ground truth data from one vehicle 100 in a group may be relevant to another vehicle 100 in the same group. For example, ground truth data showing a false positive at a specific time of operation in one of the vehicles 100 of a group may be relevant to identify an adjustment of the classifier that is applicable to all vehicles 100 in that group.

On the other hand, besides parameters from the vehicle 100 specification data, other parameters at a time of a leak detection, such as environmental data, e.g., ambient air pressure and/or temperature, vehicle 100 sensor 130 data such as recent driving conditions including engine 170 temperature, etc., may influence the leak detection results and therefore may be considered. In other words, groups of vehicles 100 grouped based on vehicle 100 specification data may be further divided (as discussed below) to define sub-groups based on dynamically changeable vehicle data (versus typically non-changeable vehicle 100 specification data) such as vehicles 100 sensor 130 data, environmental data, etc. to identify the vehicles 100 in sub-groups.

In one example, defining sub-groups of a vehicle group may further include determining a statistical correlation of the vehicle 100 sensor 130 data and environmental data associated with the vehicles 100 includes in the selected vehicle group, and identifying two or more vehicles 100 from the vehicle 100 group based on the determined statistical correlation and a deviation threshold.

The statistical correlation of the vehicle sensor data may include a geographical distribution of the vehicles 100 of a respective vehicle 100 group. The deviation threshold may include a maximum dimension threshold associated with an area in which the vehicles 100 of the sub-group are geographically located. For example, vehicles 100 of a vehicle 100 group that are geographically located within a circular area with a radius of 5 km may be placed in one sub-group. The vehicles 100 of a vehicle 100 sub-group may have an engine 170 temperature at engine 170 shut off time that is within a certain range, e.g., 500 to 600 degrees Celsius. In yet another example, the computer 185 may be programmed to receive engine 170 temperature via the network 190 from the vehicles 100 and identify two or more vehicles 100 from a respective group of vehicles 100 based on the received temperature data, e.g., based on median temperature of 520 degrees Celsius and a deviation of 15 degrees Celsius.

Figure 3A:
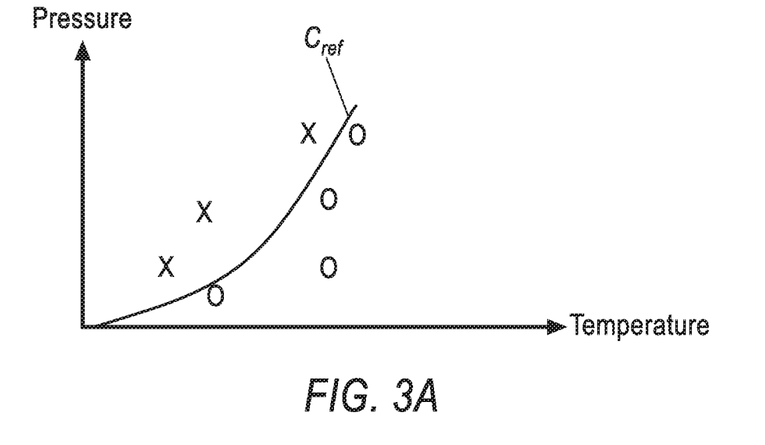
FIG. 3A-3C are exemplary graphs depicting a reference classifier and adjusted classifiers for detecting a leak of the fuel tank.

The fuel tank 150 leak detection classifiers (also for convenience referred to simply as classifiers) classify a vehicle 100 fuel tank 150 into leaking and non-leaking fuel tank 150. A classifier may be a linear or non-linear line (see FIG. 3A). The computer 110 may be programmed to determine whether there is a leak in the tank 150 based on location of the operating state relative to the classifier, e.g., above or below a threshold. In the context of this disclosure, an "operating state" is a combination two or more vehicle 100 parameters at a particular point in time of vehicle 100 operation, the parameters including sensor 130 data, and possibly other data, such as environmental data, etc. For example, as shown in FIG. 3A, the classifier $C_{ref}$ classifies operating states that are combination of temperature and pressure of the fuel tank 150 into leaking and non-leaking. Vehicle 100 operation point may be associated with a leaking or a non-leaking fuel tank 150 based on the ground truth data. The operating states "O" represent exemplary operating states of a (correctly detected) leaking fuel tank 150, whereas the operating states "X" represent exemplary (correctly detected) non-leaking fuel tanks that are included in a sub-group. In other words, the classifier $C_{ref}$ classifies the operating states "O", "X" of a sub-group of vehicles 100.

In one example, measurements are made in a lab to identify operating states "O" for respective detected leaks, and operating states "X" for respective times when a leak was not detected. For example, a valve with an opening greater than 0.02 inch may be mounted to the tank and the operating states of the tank are determined to represent operating states "O". Similarly, operating states of a non-leaking tank 150 are measured in the lab to identify multiple non-leaking points "X". Then using a mathematical technique such as a data classification method the classifier $C_{ref}$ is generated that separates all leaking operating states "O" from all non-leaking operating states "X". In one example, the operating states include more than two parameters, e.g., temperature and pressure inside the tank 150, engine 170 temperature, ambient temperature, etc. Thus, the classifier may be a multi-dimensional plane, surface, etc. Data classification methods may include support vector machine (SVM), relevance vector machine (RVM), etc.

As discussed above, the computer 185 may be programmed to adjust the classifiers to prevent further false positive and/or misdetection of a leak. In one example, the computer 185 may be programmed to identify, using data from a sub-group of vehicles, and based on the leak detection status of the vehicle 100 indicating a detected leak and a leak test result of the vehicle 100 concluding there is no leak, a falsely detected leak in a specific vehicle 100. The computer 185 may be programmed to adjust the classifiers for the sub-group that includes the vehicle 100 with the falsely detected leak. In other words, based on the ground truth showing one false detection in a vehicle 100 in a sub-group, the computer 185 may determine an adjusted classifier which may be applicable to other vehicles 100 in the same sub-group. Such an adjusted classifier may lead to avoiding such false detection in future by other vehicles 100 computer 110 of that sub-group.

In one example, a group of vehicles 100 includes vehicles with a fuel tank 150 volume of 50 and a specific engine 170 type. The remote computer 185 may identifies a number, e.g. 10, of vehicles 100 in a certain elevation with a certain ambient air pressure as a sub-group. The remote computer 185 may then adjust a classifier based on the ground truth data for that sub-group. For example, as shown in FIG. 3A, the computer 185 may determine, based on the received ground truth data, that the operating state $O_F$ includes a false positive, i.e., a leaking fuel tank 150 is falsely identified as detected based on the classifier $C_{ref}$. The computer 185 may be programmed to identify an adjusted leak detection classifier, e.g., a curve threshold $C_1$, based on the vehicle 100 sensor data and the ground truth.

In other words, the remote computer 185 may identify a classifier $C_1$ that separates (i) the previously identified non-leaking operating states "X" and the identified false detection operating state $O_F$ from (ii) the previously identified leaking operating states "O". The computer 185 may then transmit data including the adjusted classifier to vehicles 100 (not limited to the vehicles 100 identified as sub-group of vehicles mentioned above). Thus, any other vehicle 100 computer 110 that receives the adjusted classifier may prevent such false detection if the vehicle 100 operating state $O_F$ corresponds to, e.g., the operating state $O_F$. Thus, if another vehicle 100 of the above-mentioned group that was not identified in the sub-group moves to that sub-group, e.g., the user actuates the vehicle to drive to such an elevation associated with the above-mentioned sub-group, then the adjusted classifier $C_1$ may prevent a misdetection of a leak.

Figure 3B:
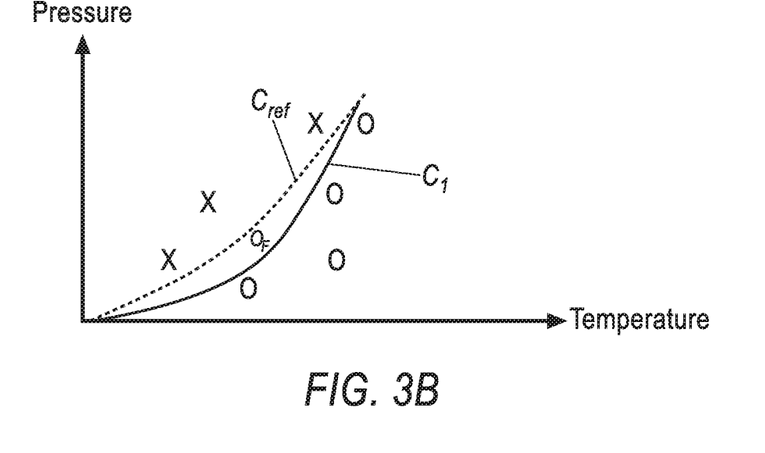
Figure 3C:
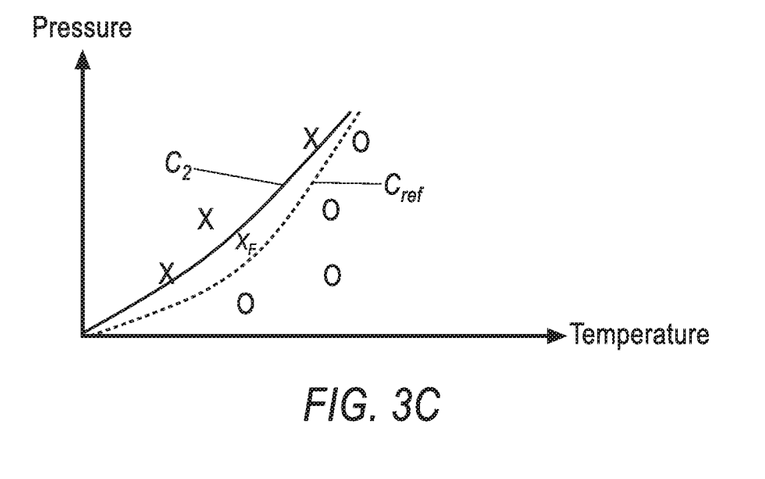

In another example shown in FIG. 3C, the computer 185 may receive ground truth data including a leak detection status indicating no leak for the operating state $X_F$, whereas a lab leak test result indicates a leak in the tank 150. The computer 185 may be programmed to identify an adjusted leak detection classifier, e.g., a curve threshold $C_2$, based on the vehicle 100 sensor data and the ground truth. In other words, the remote computer 185 may identify a classifier that separates (i) the previously identified non-leaking operating states "X" from (ii) the identified operating state $X_F$ and the previously identified leaking operating states "O". The computer 185 may then transmit data including the adjusted classifier $C_2$ to vehicles 100 (not limited to the vehicles 100 identified as sub-group of vehicles mentioned above). Thus, any other vehicle 100 computer 110 that receives the adjusted classifier $C_2$ may be able to detect the leak at the operating state $X_F$. In other words, if another vehicle 100 of the above-mentioned group that was not identified in the sub-group moves to that sub-group, e.g., the user actuates the vehicle to drive to such an elevation associated with the above-mentioned sub-group, then the adjusted classifier $C_2$ may lead to correctly detecting the leak, e.g., the computer 110 may be programed to detect a leak at the operating state $X_F$ based on the adjusted classifier $C_2$.

As stated above, an operating state may be multi-dimensional and therefore a classifier may be multi-dimensional, e.g., a surface. Thus, an adjusted classifier may include an adjusted surface. For example, an adjustment of a classifier surface may lead to create a dent, protrusion, etc. on a surface based on the received ground truth. For example, a classifier surface may have a dent to classify an operating state differently based on an identified misdetection or false positive. In other words, like adjusting the curve $C_{ref}$ in FIGS. 3B-3C to classify an operating state $X_F$ or $O_F$ differently based on the received ground truth data, a surface classifier may have a dent or protrusion to classify an operating state differently to prevent a misdetection or false positive.

Processing

Figure 4:
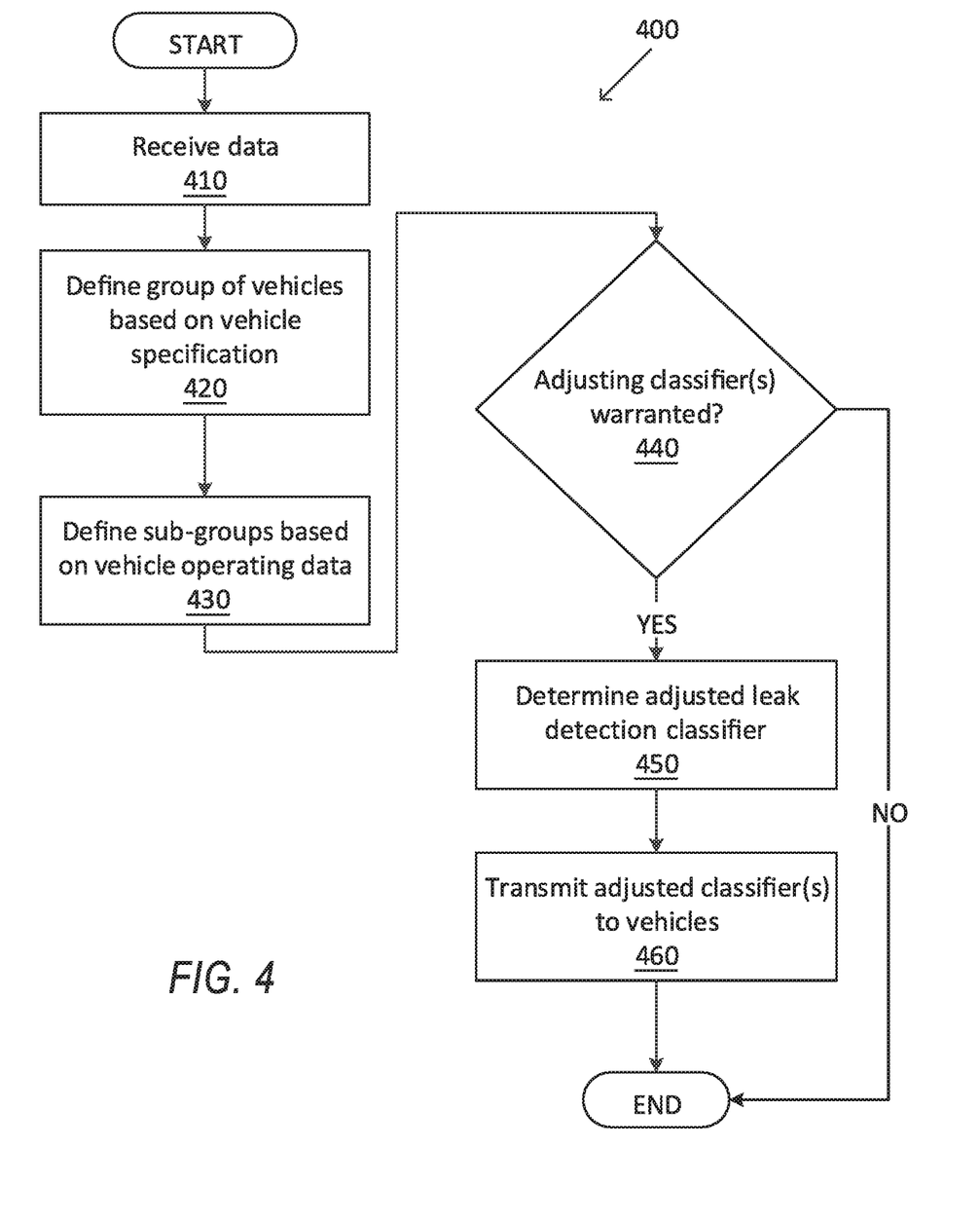
FIG. 4 is a flowchart of an exemplary process for adjusting the reference classifier for detecting a leak of the fuel tank.

FIG. 4 is a flowchart of an exemplary process 400 for adjusting a leak detection classifier for detecting a leak of a vehicle 100 fuel tank 150. For example, the remote computer 185 may be programmed to execute blocks of the process 400.

The process 400 begins in a block 410, in which the remote computer 185 receives data from vehicles 100, other computers such as weather station computers, etc. The received data may include vehicles 100 specification data, environmental data, vehicles 100 sensor 130 data, ground truth data, etc. For example, the computer 185 may receive vehicle 100 sensor 130 data including fuel tank 150 temperature and/or pressure from the vehicles 100. The computer 185 may receive ground truth data from another remote computer such a manufacturer dealership computer.

Next, in a block 420, the remote computer 185 defines groups of vehicles 100, e.g., based on vehicle 100 specification data. For example, the remote computer 185 may be programmed to determine two groups of vehicles: (i) vehicles 100 with 2.2-liter engine 170 capacity and 50-liter fuel tank 150, and (ii) vehicles 100 with 3.6-liter engine 170 and 60-liter fuel tank 150. The remote computer 185 may be programmed to define groups based on any other combination of parameters from the vehicles 100 specification data.

Next, in a block 430, the remote computer 185 defines one or more sub-groups of vehicles 100 for each of the defined vehicle 100 groups. The remote computer 185 may define the sub-groups based on vehicle 100 operating data including vehicles 100 sensor 130 data, environmental data associated with each of the vehicles 100, etc. In one example, the remote computer 185 may be programmed to define the sub-groups based on geographical distributions of vehicles 100 in each group. For example, a sub-group of the vehicle 100 group "2.2-liter engine 170 capacity and 50-liter fuel tank 150" may include the vehicle 100 in a certain altitude (e.g., above sea level) range and/or typical ambient air pressure range (that can be identified based on vehicle 100 GPS sensor 130 data).

Next, in a decision block 440, the remote computer 185 determines whether an adjustment of one or more classifiers is warranted. For example, the remote computer 185 may be programmed to determine that the adjustment of classifier(s) is warranted upon identifying a false positive (detection of a non-existent leak) and/or misdetection (lack of detecting an existing leak) based on the received ground truth data. If the remote computer 185 determines that the adjustment of the classifier(s) is warranted, then the process 400 proceeds to a block 450; otherwise the process 400 ends, or alternatively, returns to the block 410, although not shown in FIG. 4.

In the block 450, the remote computer 185 determines an adjusted leak detection classifier. For example, the remote computer 185 may be programmed to identify an adjusted classifier, e.g., the curve thresholds $C_1$, $C_2$ as shown in FIGS. 3B-3C, based on the vehicle 100 sensor 130 data and the ground truth data.

Next, in a block 460, the remote computer 185 transmits the adjusted classifier(s) to vehicles 100, e.g., via the network 190. In one example, the remote computer 185 may be programed to transmit a message to vehicles 100 including a notification about an adjustment of leak detection classifiers. The remote computer 185 may be further programmed to transmit data including the adjusted classifier(s) to a vehicle 100 upon receiving a request for the adjusted classifier(s). As another example, the remote computer 185 may be programmed to broadcast the adjusted classifier(s) data periodically, e.g., every second, to the vehicle 100.

Following the block 460, the process 400 ends, or alternatively, returns to the block 410, although not shown in FIG. 4.

Figure 5:
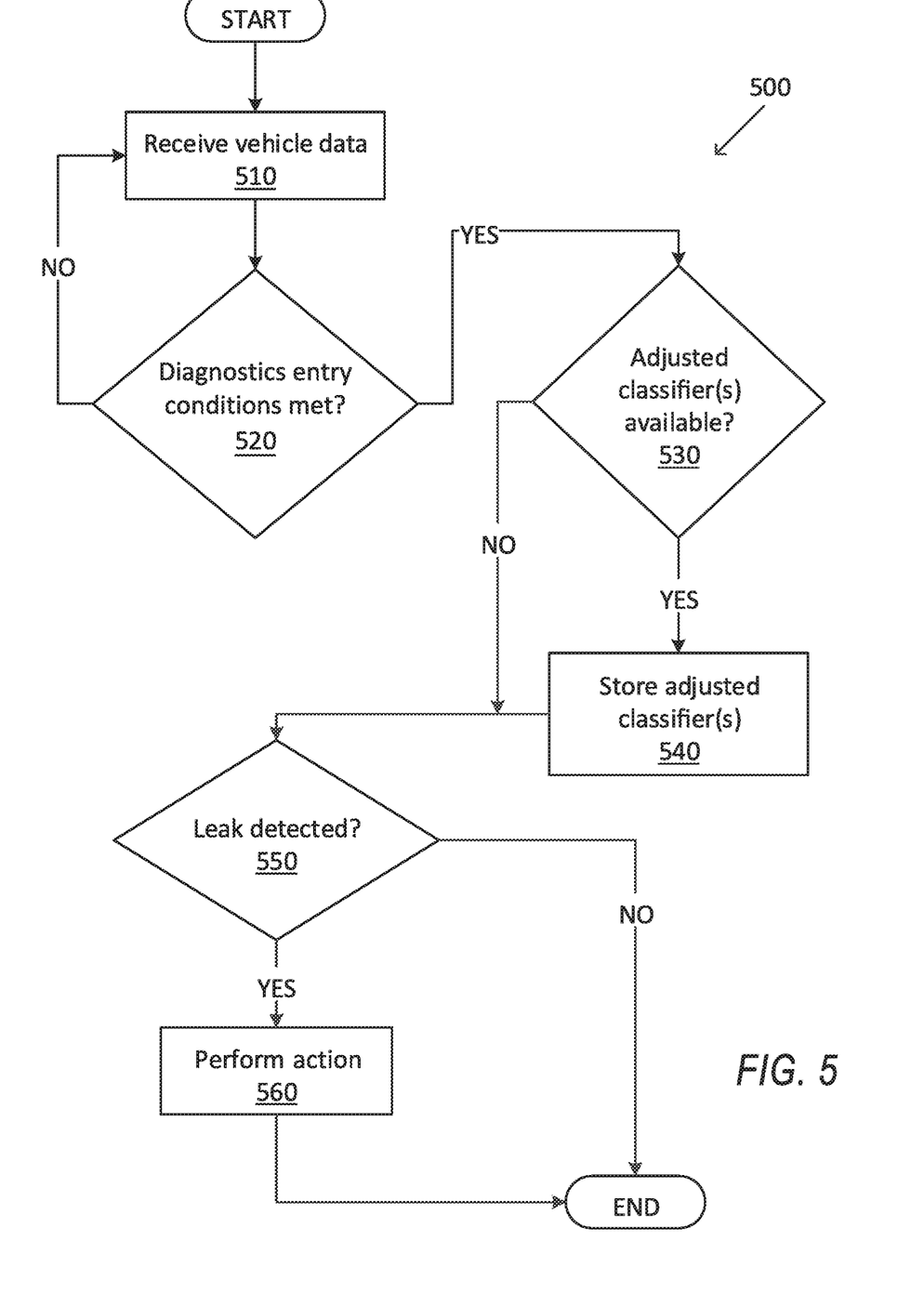
FIG. 5 is a flowchart of an exemplary process for detecting a leak of a vehicle fuel tank.

FIG. 5 is a flowchart of an exemplary process 500 for detecting a leak of a vehicle 100 fuel tank 150. For example, a vehicle 100 computer 110 may be programmed to execute blocks of the process 500.

The process 500 begins in a block 510, in which the vehicle 100 computer 110 receives vehicle 100 data. For example, the vehicle 100 computer 110 may be programmed to receive the sensor 130 data, e.g., fuel tank 150 pressure and/or temperature, engine 170 status, etc. The computer 110 may be further programmed to receive environmental data, e.g., ambient air temperature and/or pressure, precipitation status, etc.

Next, in a decision block 520, the computer 110 determines whether diagnostics entry condition(s) are met. For example, the computer 110 may be programmed to determine whether the vehicle 100 is stopped and the vehicle 100 engine 170 is in an off state. In another example, the computer 110 may be programmed to determine that the diagnostic conditions are met upon determining that the engine 170 is in the off state and the time elapsed since turning off the engine 170 is less than 30 minutes. If the computer 110 determines that the diagnostic entry condition(s) are met, then the process 500 proceeds to a decision block 530; otherwise the process 500 returns to the block 510.

In the decision block 530, the computer 110 determines whether an adjusted classifier is available. In one example, the computer 110 may receive a message from the remote computer 185 and determine whether the message includes a notification about changing a classifier. In another example, the computer 110 may be programmed to determine whether adjusted classifiers data is broadcasted by the remote computer 185. In yet another example, the computer 110 may be programmed to transmit a message to the remote computer 185 including a request for adjusted classifiers. Additionally or alternatively, in a vehicle 100 service center, e.g., a dealership garage, a service personal may connect a programming device to the vehicle 100 network and the programming device may store the adjusted classifiers in the vehicle 100 computer 110. The programming device may receive the adjusted classifiers from the remote computer 185. If the computer 110 determines that the adjusted classifiers are available, then the process 500 proceeds to a block 540; otherwise the process 500 proceeds to a decision block 550.

In the block 540, the computer 110 stores the adjusted classifiers in the computer 110 memory. In one example, the computer 110 may be programmed to store the received adjusted classifiers in a non-volatile memory of the computer 110.

In the decision block 550, the computer 110 determines whether there is a leak in the fuel tank 150. The computer 110 may be programmed to determine whether there is a leak with a diameter greater than or equal 0.02 inch based on the leak detection classifier. The leak detection classifier(s) may be the reference classifier, e.g., the classifier $C_{ref}$ and/or an adjusted classifier, e.g., the classifier(s) $C_1$, $C_2$ (dependent on whether the decision block 550 is reached from the decision block 530 or the block 540). If the computer 110 determines that there is a leak in the fuel tank 150, then the process 500 proceeds to a block 560; otherwise the process 500 ends, or alternatively, returns to the block 510, although not shown in FIG. 5.

Next, in the block 560, the computer 110 performs an action based on the detected leak. For example, the computer 110 may be programmed to actuate the vehicle 100 HMI 140 to turn on an HMI 140 malfunction indicator light. Following the block 560, the process 500 ends, or alternatively, returns to the block 510, although not shown in FIG. 5.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. System, co a processor programmed to:
define a plurality of vehicle groups based on vehicle specification data;
define a plurality of sub-groups for each of the vehicle groups based on environmental data and sensor data received from each of a plurality of vehicles, including defining sub-groups of a selected vehicle group by:
determining a statistical correlation of the vehicle sensor data and environmental data associated with the vehicles included in the selected vehicle group; and
identifying two or more vehicles from the vehicle group based on the determined statistical correlation and a deviation threshold; and
adjust fuel tank leak detection classifiers for the sub-groups based on ground truth data including, for each of the plurality of vehicles, a leak detection status and a leak test result.

2. The system of claim 1, wherein the vehicle specification data include one or more of vehicle model, fuel tank volume, fuel tank thermal properties, engine volume, location of heat dissipating vehicle components relative to the fuel tank, transmission properties, fuel tank shape, exhaust parameters, and location of fuel tank pressure sensor relative to the fuel tank.

3. The system of claim 1, wherein the vehicle sensor data include one or more of engine operating state, fuel tank pressure, fuel tank temperature, engine coolant temperature, fuel parameters, vehicle orientation, vehicle location coordinates, fuel gauge value, last trip duration last trip driving conditions, and last trip route.

4. The system of claim 1, wherein the environmental data include one or more of air temperature, air pressure, precipitation status, and wind condition.

5. The system of claim 1, wherein the processor is further programmed to define vehicle groups by identifying two or more vehicles that share at least one identical parameter included in the vehicle specification data.

6. The system of claim 1, wherein the statistical correlation of the vehicle sensor data includes a geographical distribution of the vehicles of the selected vehicle group.

7. The system of claim 6, wherein the deviation threshold includes a maximum dimension threshold associated with an area in which the vehicles of the sub-group are geographically located.

8. The system of claim 1, wherein the processor is further programed to adjust the fuel tank leak detection classifiers by identifying a leak detection curve threshold based on the vehicle sensor data and the ground truth data.

9. The system of claim 8, wherein the ground truth data further includes vehicle sensor data and ambient data from a time of detecting a leak in the fuel tank.

10. The system of claim 8, wherein the leak detection curve threshold is determined based on a data classification technique.

11. The system of claim 8, wherein the processor is further programed to:
  identify at least a falsely detected leak in a vehicle in the plurality of vehicles, wherein the leak detection status of the vehicle indicates a detected leak, and a leak test result of the vehicle is negative; and
  adjust the classifiers for the sub-group that includes the vehicle based on the falsely detected leak.

12. The system of claim 1, wherein the leak detection status further includes a time of detecting a leak, and vehicle operating data from the time of detecting the leak.

13. The system of claim 1, wherein the processor is further programmed to perform leak detection based on the adjusted classifiers.

14. The system of claim 1, wherein the leak test result is a smoke test result.

15. A method, comprising:
  defining a plurality of vehicle groups based on vehicle specification data;
  defining a plurality of sub-groups for each of the vehicle groups based on environmental data and sensor data received from each of a plurality of vehicles, including defining sub-groups of a selected vehicle group by:
    determining a statistical correlation of the vehicle sensor data and environmental data associated with the vehicles included in the selected vehicle group; and
    identifying two or more vehicles from the vehicle group based on the determined statistical correlation and a deviation threshold; and
  adjusting fuel tank leak detection classifiers for the sub-groups based on ground truth data including, for each of the plurality of vehicles, a leak detection status and a leak test result.

16. The method of claim 15, wherein the vehicle specification data include one or more of vehicle model, fuel tank volume, fuel tank thermal properties, engine volume, location of heat dissipating vehicle components relative to the fuel tank, and location of fuel tank pressure sensor relative to the fuel tank.

17. The method of claim 15, wherein the vehicle sensor data include one or more of engine operating state, fuel tank pressure, fuel tank temperature, vehicle orientation, vehicle location coordinates, fuel gauge value, last trip duration, last trip driving conditions, and last trip route.

18. The method of claim 15, wherein defining vehicle groups further includes identifying two or more vehicles that share at least one identical parameter included in the vehicle specification data.

* * * * *

UNITED STATES PATENT AND TRADEMARK OFFICE
CERTIFICATE OF CORRECTION

PATENT NO. : 11,527,113 B2
APPLICATION NO. : 16/611044
DATED : December 13, 2022
INVENTOR(S) : Fling Finn Tseng et al.

Page 1 of 1

It is certified that error appears in the above-identified patent and that said Letters Patent is hereby corrected as shown below:

In the Claims

Claim 1, Column 14, Line 17 replace "System, co" with "--A system, comprising--"

Signed and Sealed this
Twenty-first Day of February, 2023

Katherine Kelly Vidal
*Director of the United States Patent and Trademark Office*